(12) United States Patent
Chou

(10) Patent No.: US 8,944,666 B2
(45) Date of Patent: Feb. 3, 2015

(54) LIGHTING DEVICE

(75) Inventor: Shih-Chin Chou, Kaohsiung (TW)

(73) Assignee: Lextar Electronics Corporation, Hsinchu (TW)

( * ) Notice: Subject to any disclaimer, the term of this patent is extended or adjusted under 35 U.S.C. 154(b) by 257 days.

(21) Appl. No.: 13/542,630

(22) Filed: Jul. 5, 2012

(65) Prior Publication Data
US 2013/0182459 A1 Jul. 18, 2013

(30) Foreign Application Priority Data
Jan. 17, 2012 (TW) .............................. 101101725 A

(51) Int. Cl.
*F21V 8/00* (2006.01)

(52) U.S. Cl.
USPC ............................ 362/633; 362/612; 362/618

(58) Field of Classification Search
CPC ...................................... G02B 6/0091
USPC ........................................................ 362/633
See application file for complete search history.

(56) References Cited

U.S. PATENT DOCUMENTS

| | | | | |
|---|---|---|---|---|
| 2008/0248240 | A1* | 10/2008 | Shi ................................ | 428/141 |
| 2009/0229154 | A1* | 9/2009 | Sadon ............................ | 40/546 |
| 2010/0165253 | A1* | 7/2010 | Jung et al. ...................... | 349/65 |
| 2011/0149596 | A1* | 6/2011 | Lv et al. ......................... | 362/607 |
| 2011/0157879 | A1* | 6/2011 | Chang et al. ................... | 362/183 |
| 2012/0236597 | A1* | 9/2012 | Liao et al. ...................... | 362/612 |

FOREIGN PATENT DOCUMENTS

| | | |
|---|---|---|
| CN | 201126158 Y | 10/2008 |
| CN | 101593461 A | 12/2009 |
| TW | M313205 | 6/2007 |
| TW | M407995 | 7/2011 |
| TW | M408650 | 8/2011 |

* cited by examiner

*Primary Examiner* — Elmito Breval
(74) *Attorney, Agent, or Firm* — CKC & Partners Co., Ltd.

(57) ABSTRACT

A lighting device is provided and includes a light guide plate including a plurality of light incident surfaces and two light emitting surfaces, a plurality of edge frames, and at least one light source. Each of the edge frames includes a main body including an accommodating groove and an opening, first and second clamp members, and first and second fixing elements respectively located on first and second ends of the main body. The light emitting surfaces are clamped by the first and second clamp members of each edge frame. Each of the light incident surfaces is inserted in the main body of one of the edge frames through the opening and accommodated in the accommodating groove. The light source is located in the accommodating groove of one of the edge frames and adjacent to the corresponding light incident surface.

22 Claims, 9 Drawing Sheets

LIGHTING DEVICE

RELATED APPLICATIONS

This application claims priority to Taiwan Application Serial Number 101101725, filed Jan. 17, 2012, which is herein incorporated by reference.

BACKGROUND

1. Technical Field

The present disclosure relates to a lighting device, and more particularly to a lighting device including a light guide plate.

2. Description of Related Art

Light emitting diodes are semiconductor elements. Light emitting diodes are often used as light emitting elements in indicating lights or display panels. In recent years, with the development of white light emitting diodes, a large number of light emitting diodes have been applied to lighting devices. When a lighting device utilizes a light emitting diode together with a light guide plate, the lighting device has the advantages of high efficiency, long life span, and a high degree of ruggedness compared to lighting devices using traditional fluorescent or incandescent bulbs.

Such a lighting device typically includes a light source, a bottom plate, a frame including a hollow region, a diffusion plate, and a reflective plate. Because the frame does not function to fix the light guide plate, the frame and the bottom plate needs to be assembled to position and fix the light guide plate. The light guide plate includes two light emitting surfaces respectively facing the hollow region of the frame and the bottom plate. Light emitted from the light emitting surface which is adjacent to the hollow region can be emitted through the hollow region, but light emitted from the light emitting surface which is adjacent to the bottom plate is shielded by the bottom plate. As a result, the reflective plate is often placed between the bottom plate and the light emitting surface adjacent to the bottom plate by manufacturers, such that the light emitted from the light emitting surface which is adjacent to the bottom plate can be emitted through the hollow region by the reflective plate, so as to increase the brightness of the lighting device. In addition, the diffusion plate can be located on the light emitting surface which is adjacent to the hollow region to increase the uniformity of the light.

However, such a conventional lighting device requires the bottom plate and the frame to position and fix the light guide plate, and as a result of this configuration, the material and assembly costs are increased. Furthermore, since the conventional lighting device includes the bottom plate, the lighting device only can emit light through a single side, such that light output utility is reduced and electric power is wasted.

SUMMARY

An aspect of the present invention is to provide a lighting device.

In an embodiment of the present invention, a lighting device includes an N-sided polygonal light guide plate, N edge frames, and at least one light source. N is a natural number more than or equal to 3. The N-sided polygonal light guide plate includes N light incident surfaces and two opposite light emitting surfaces. Each of the light incident surfaces is perpendicular to the light emitting surfaces. Each of the edge frames corresponds to one of the light incident surfaces, and each of the edge frames includes a main body, a first clamp member and a second clamp member, and a first fixing element and a second fixing element. The main body is bendedly formed by a first, a second, and a third adjacent rectangular planes, and includes an accommodating groove and an opening. The first clamp member and the second clamp member symmetrically extend outward respectively from the edges of the first and the third rectangular planes. A top and a bottom surfaces of the light guide plate corresponding respectively to the light emitting surfaces are respectively clamped by the first and the second clamp members of the edge frame. The corresponding light incident surface is inserted in the main body of the edge frame through the opening of the main body of the edge frame, such that the corresponding light incident surface is accommodated in the accommodating groove of the edge frame. The first fixing element and the second fixing element are respectively located on a first and a second ends of the main body of the edge frame. The edge frame is pivoted to the second and the first fixing elements located on the main body of an adjacent one of the edge frames respectively by the first and the second fixing elements thereof. The light source is located in the accommodating groove of one of the edge frames and adjacent to the corresponding light incident surface. When light is emitted from the light source, the light enters the light guide plate from the corresponding light incident surface, and is emitted through the two light emitting surfaces.

In an embodiment of the present invention, the first and the second fixing elements of each of the edge frames respectively include a first and a second fixing holes. When the first fixing hole of the first fixing element of one of the edge frames is aligned with the second fixing hole of the second fixing element of an adjacent one of the edge frames, the first and the second fixing elements are fixed by a third fixing element penetrating the first and the second fixing elements, such that the adjacent edge frames are fixed to each other.

In an embodiment of the present invention, the third fixing element includes a bolt, a screw, or a crew nail.

An aspect of the present invention is to provide a lighting device.

In an embodiment of the present invention, a lighting device includes an N-sided polygonal light guide plate, N edge frames, and at least one light source. The N-sided polygonal light guide plate includes N light incident surfaces and two opposite light emitting surfaces. N is a natural number more than or equal to 3. Each of the light incident surfaces is perpendicular to the light emitting surfaces. Each of the edge frames corresponds to one of the light incident surfaces, and each of the edge frames includes a main body, a first clamp member and a second clamp member, and a third clamp member. The main body is bendedly formed by a first, a second, and a third adjacent rectangular planes, and includes an accommodating groove and an opening. The first clamp member and the second clamp member symmetrically extend outward respectively from the edges of the first and the third rectangular planes. A top and a bottom surfaces of the light guide plate corresponding respectively to the light emitting surfaces are respectively clamped by the first and the second clamp members of the edge frame. The corresponding light incident surface is inserted in the main body of the edge frame through the opening of the main body of the edge frame, such that the corresponding light incident surface is accommodated in the accommodating groove of the edge frame. The third clamp member is located on an end of the main body of the edge frame to clamp an end of one of the edge frames adjacent to the third clamp member. The light source is located in the accommodating groove of one of the edge frames and adjacent to the corresponding light incident surface. When light is emitted from the light source, the light enters the light guide plate from the corresponding light incident surface, and is emitted through the two light emitting surfaces.

An aspect of the present invention is to provide a lighting device.

In an embodiment of the present invention, a lighting device includes a 2M-sided polygonal light guide plate, M edge frames and at least one light source. M is a natural number more than or equal to 2. The 2M-sided polygonal light guide plate includes 2M light incident surfaces and two opposite light emitting surfaces. Each of the light incident surfaces is perpendicular to the light emitting surfaces. Each of the edge frames corresponds to two of the adjacent light incident surfaces, and includes a main body, a first clamp member and a second clamp member, and a third clamp member. The main body is bendedly formed by a first, a second, and a third adjacent rectangular planes, and includes an accommodating groove and an opening. The first clamp member and the second clamp member symmetrically extend outward respectively from the edges of the first and the third rectangular planes. A top and a bottom surfaces of the light guide plate corresponding respectively to the light emitting surfaces are respectively clamped by the first and the second clamp members of the edge frame. The corresponding light incident surface is inserted in the main body of the edge frame through the opening of the main body of the edge frame, such that the corresponding light incident surface is accommodated in the accommodating groove of one of the edge frames. The third clamp member is located on an end of the main body of the edge frame to clamp an end of one of the edge frames adjacent to the third clamp member. The light source is located in the accommodating groove of one of the edge frames and adjacent to the corresponding light incident surface. When light emitted from the light source, the light enters the light guide plate from the corresponding light incident surface, and is emitted through the two light emitting surfaces.

In an embodiment of the present invention, the third clamp member located on the main body of each of the edge frames includes a first fixing hole, and another end of the main body includes a second fixing hole. When the first fixing hole of the third clamp member of one of the edge frames is aligned with the second fixing hole in an end of an adjacent one of the edge frames, the third clamp member and the end including the second fixing hole are fixed by a fixing element penetrating the third clamp member and the end including the second fixing hole, such that the adjacent edge frames are fixed to each other.

In an embodiment of the present invention, the fixing element includes a bolt, a screw, or a crew nail.

In an embodiment of the present invention, the lighting device further includes a housing including at least one light transmissive portion and an accommodating space. The accommodating space accommodates the light guide plate, the edge frames, and the light source, and the position of the light transmissive portion corresponds to the position of the light guide plate.

In an embodiment of the present invention, the main body, and the first and the second clamp members of each of the edge frames are formed as a single piece.

In an embodiment of the present invention, the light source includes a light emitting diode.

In an embodiment of the present invention, each of the edge frames is V-shaped or L-shaped.

In the aforementioned embodiments of the present invention, each of the edge frames includes the first clamp member and the second clamp member, and the first fixing element and the second fixing element. As a result, the light guide plate can be clamped by the first and second clamp members of the edge frames, and each of the edge frames can be pivoted to the second and first fixing elements located on the main body of the adjacent edge frame by the first and second fixing elements thereof. The light guide plate is positioned and fixed through use of only the edge frames of the lighting device, such that the lighting device does not need to include a conventional bottom plate. Consequently, the lighting device can reduce the material and assembly costs. Moreover, the lighting device also emits light through two sides, such that light output utility can be increased and electric power can be saved.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
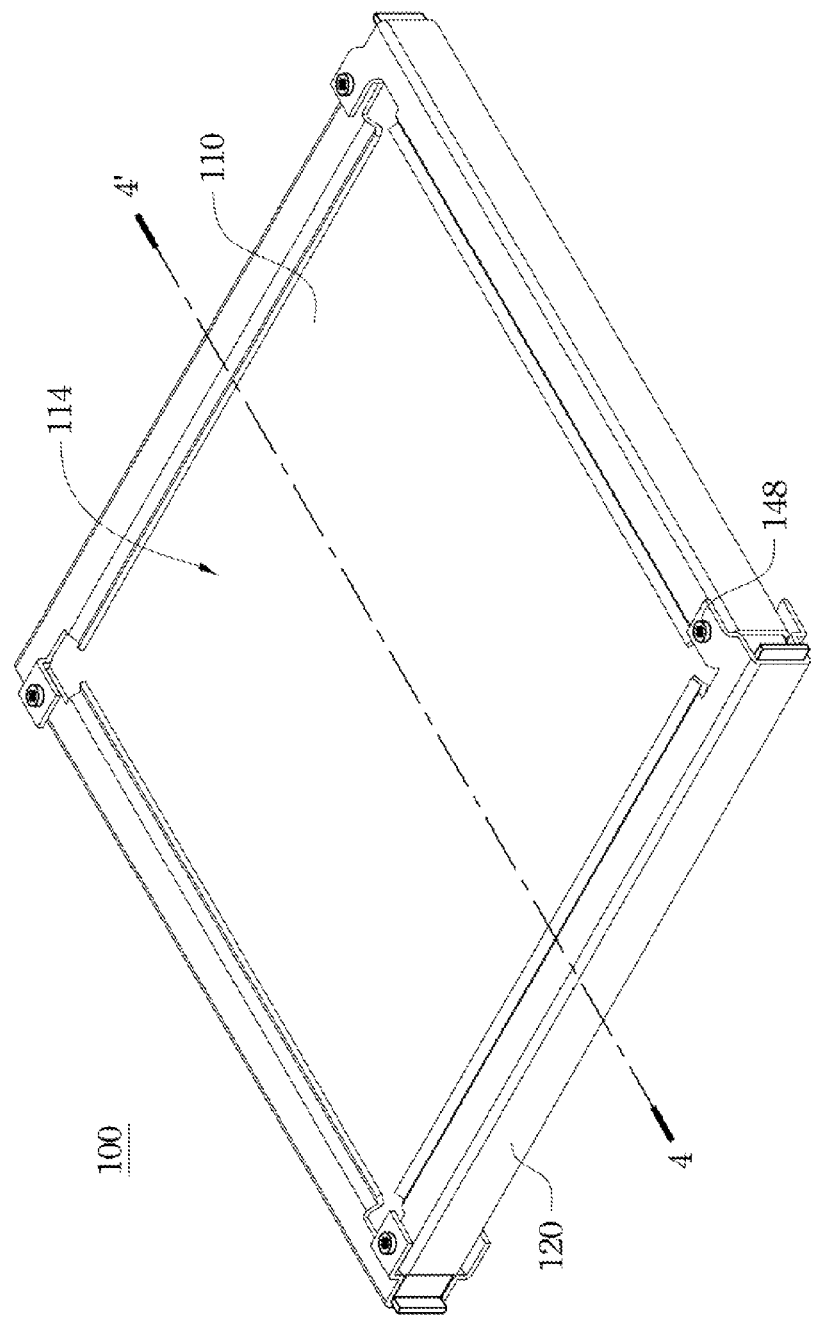
FIG. 1 is a perspective view of a lighting device of an embodiment of the present invention.
Figure 2:
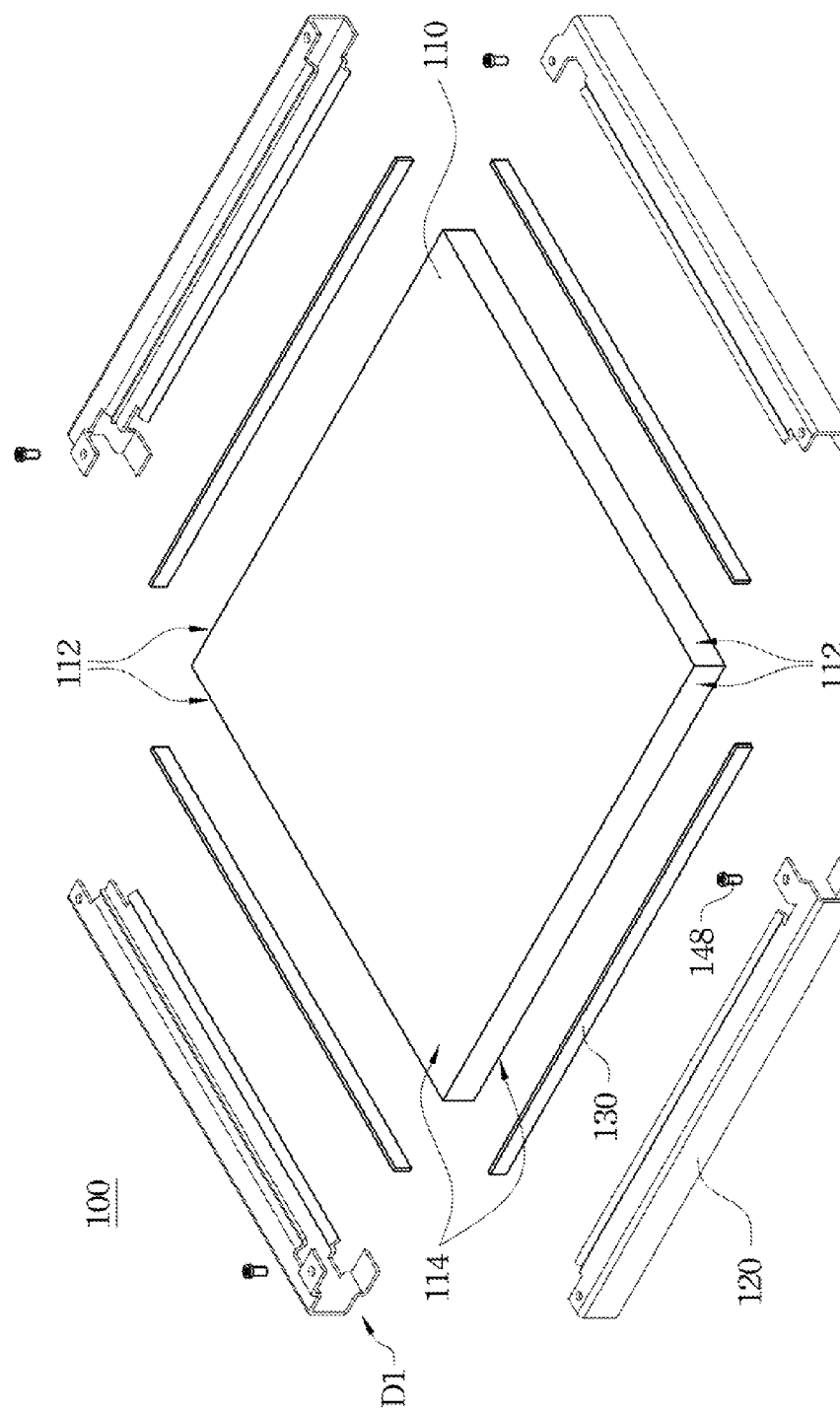
FIG. 2 is an exploded view of the lighting device shown in FIG. 1.

FIG. 1 is a perspective view of a lighting device 100 of an embodiment of the present invention. FIG. 2 is an exploded view of the lighting device 100 shown in FIG. 1. As shown in FIG. 1 and FIG. 2, the lighting device 100 includes an N-sided polygonal light guide plate 110, N edge frames 120, and at least one light source 130. The N-sided polygonal light guide plate 110 includes N light incident surfaces 112 and two opposite light emitting surfaces 114. Each of the light incident surfaces 112 is perpendicular to the light emitting surfaces 114. Each of the edge frames 120 corresponds to one of the light incident surfaces 112. In this embodiment, the number of the light source 130 is four, and N is four as an example. However, in other embodiments, N may be another natural number more than or equal to 3, and the present invention is not limited in this regard.

Figure 3:
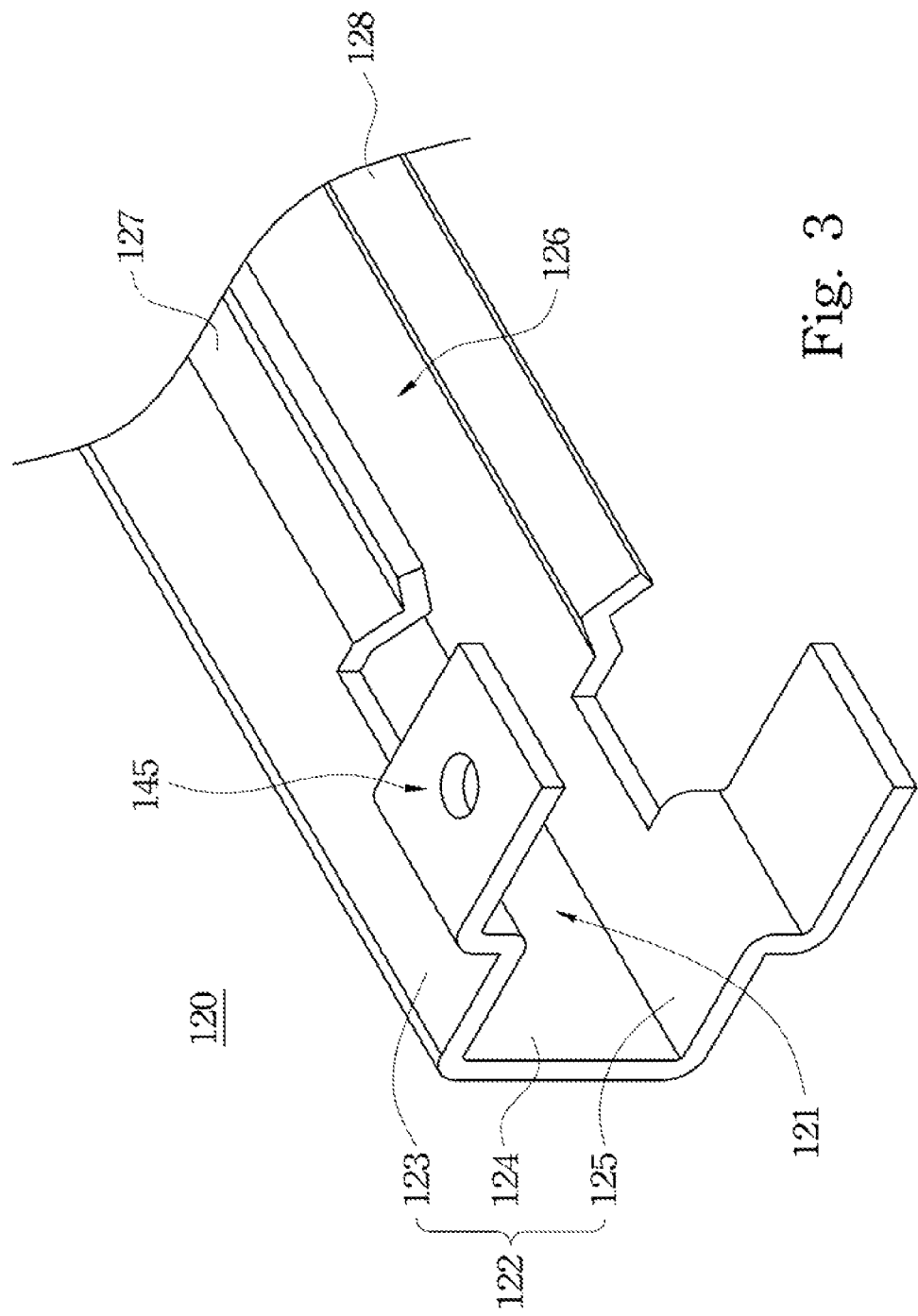
FIG. 3 is a partial enlarged view of one of a plurality of edge frames shown in FIG. 2, which is seen from a direction D1.
Figure 4:
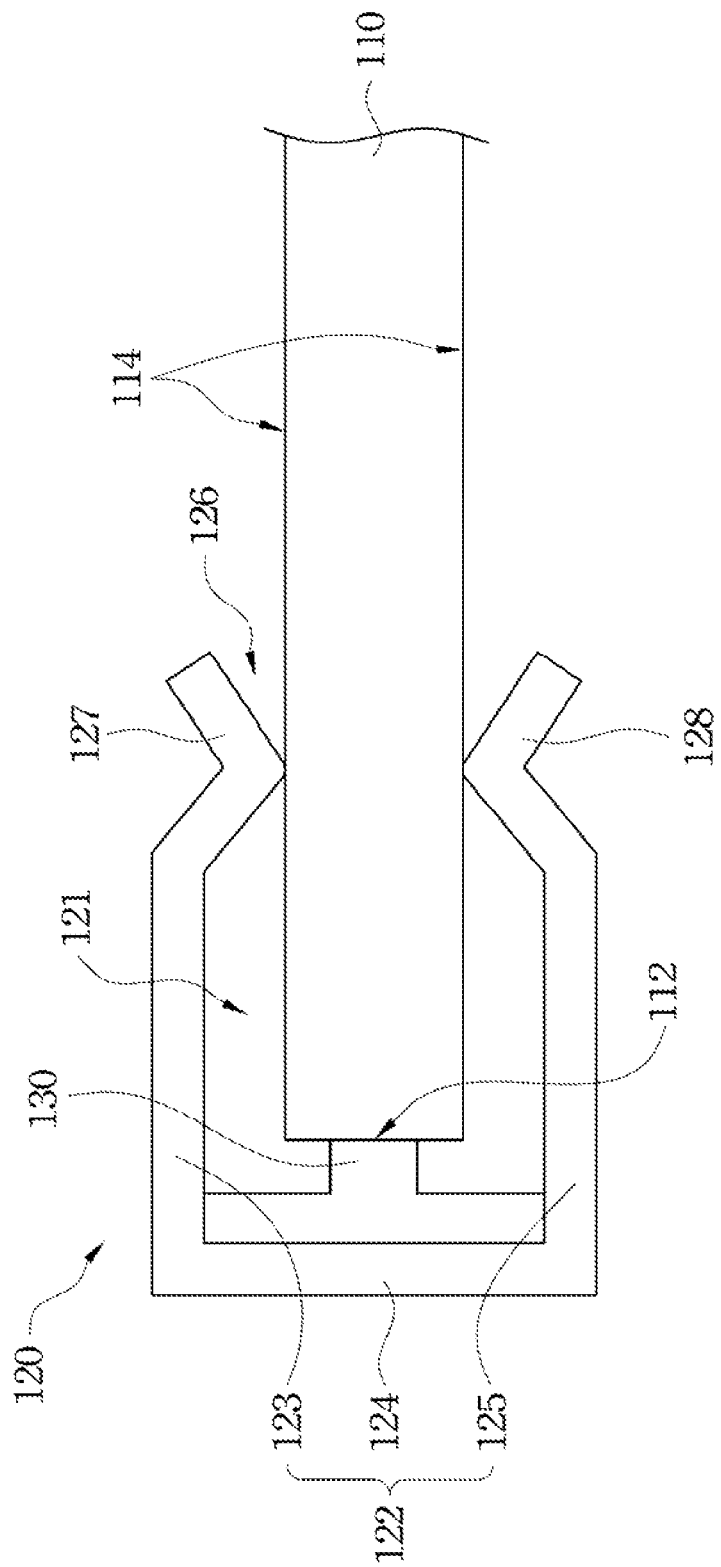
FIG. 4 is a cross sectional view of the lighting device taken along line 4-4' shown in FIG. 1.

FIG. 3 is a partial enlarged view of one of the edge frames 120 shown in FIG. 2, which is seen from a direction D1. FIG. 4 is a cross sectional view of the lighting device 100 taken along line 4-4' shown in FIG. 1. As shown in FIG. 3 and FIG. 4, the edge frame 120 includes a main body 122, and a first clamp member 127 and a second clamp member 128. The main body 122 is bendedly formed by first, second, and third adjacent rectangular planes 123, 124, 125, such that the main body 122 includes an accommodating groove 121 and an opening 126.

Moreover, the first clamp member 127 extends outward from the edge of the first rectangular plane 123 of the main body 122, and the second clamp member 128 extends outward from the edge of the third rectangular plane 125 of the main body 122. The first clamp member 127 and the second clamp member 128 are formed substantially symmetrically. As a result, top and bottom surfaces of the light guide plate 110, that is, the light emitting surfaces 114 of the light guide plate 110, can be respectively clamped by the first and the second clamp members 127, 128 of the edge frame 120. The corresponding light incident surface 112 is inserted in the main body 122 through the opening 126 of the main body 122 of the edge frame 120, such that the light incident surface 112 can be accommodated in the accommodating groove 121 of the edge frame 120.

The corresponding light source 130 is located in the accommodating groove 121 of the edge frame 120 and adjacent to the corresponding light incident surface 112. When light is emitted from the light source 130, the light enters the light guide plate 110 from the light incident surface 112, and is emitted through the two light emitting surfaces 114.

In this embodiment, the main body 122, the first clamp member 127, and the second clamp member 128 may be formed as a single piece. The material of the edge frame 120 may include steel electrogalvanized cold-rolled coil (SECC) or other metal materials. In addition, the light source 130 may include a light emitting diode.

Figure 5:
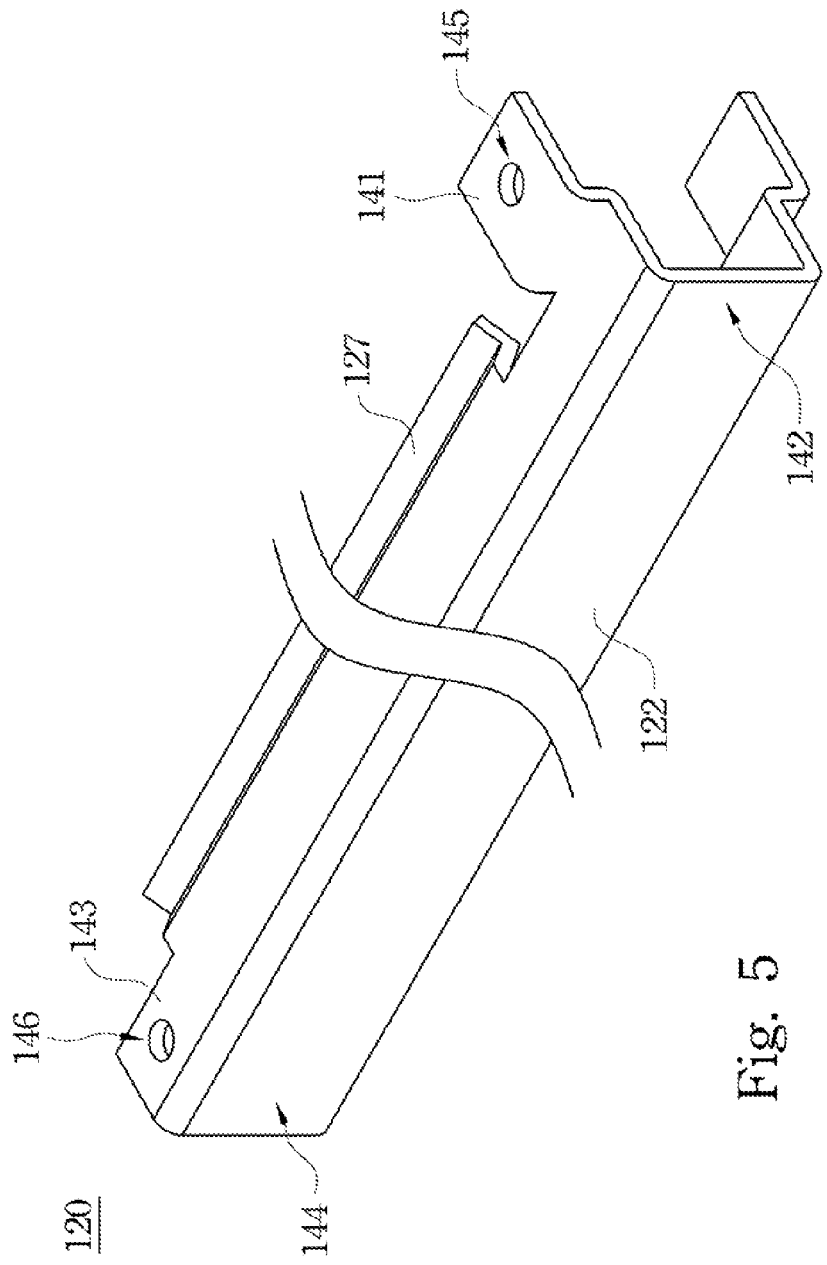
FIG. 5 is another partial enlarged view of one of the edge frames shown in FIG. 2.
Figure 6:
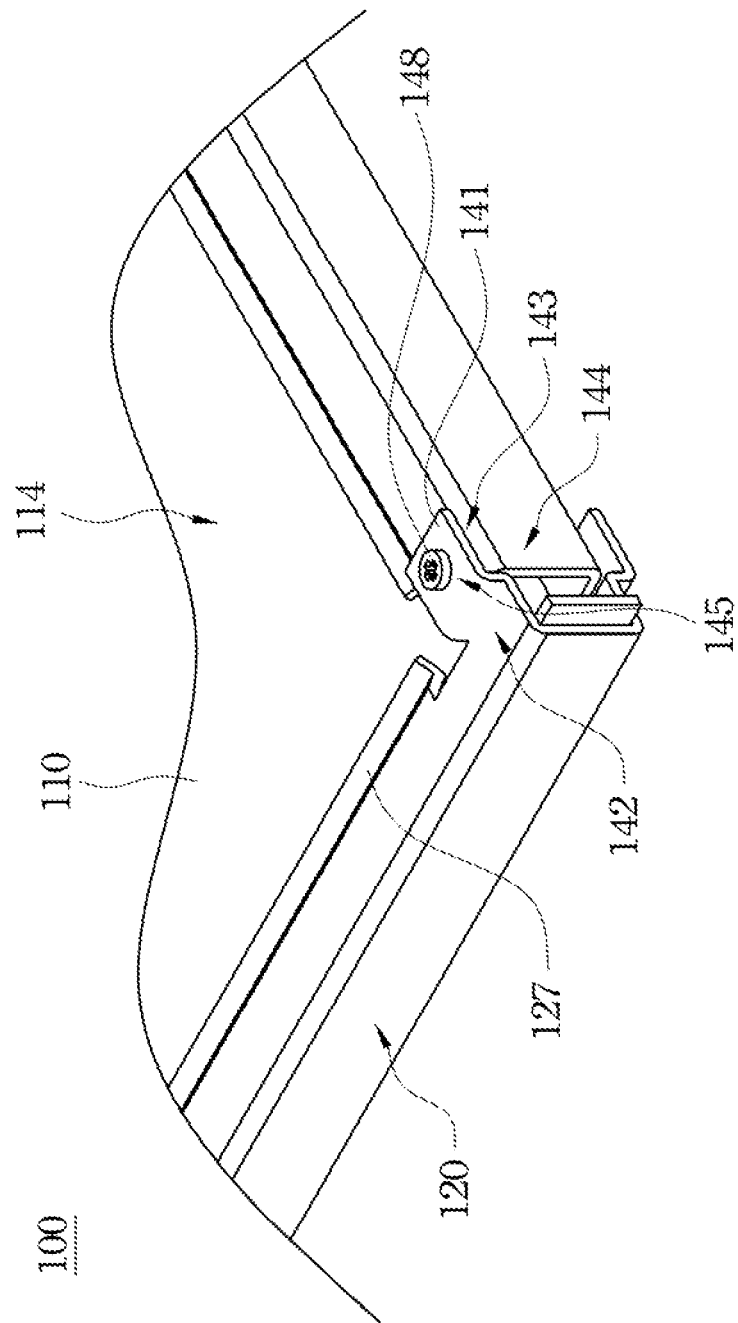
FIG. 6 is a partial enlarged view of the lighting device shown in FIG. 1.

FIG. 5 is another partial enlarged view of one of the edge frames 120 shown in FIG. 2. FIG. 6 is a partial enlarged view of the lighting device 100 shown in FIG. 1. As shown in FIG. 5 and FIG. 6, the edge frame 120 further includes a first fixing element 141 and a second fixing element 143 respectively located on two ends of the main body 122. That is, the first fixing element 141 is located on a first end 142 of the main body 122, and the second fixing element 143 is located on a second end 144 of the main body 122. Each of the edge frames 120 can be pivoted to the second fixing element 143 located on the main body 122 of an adjacent edge frame 120 by the first fixing element 141 thereof. Stated differently, each of the edge frames 120 can be pivoted to the first fixing element 141 located on the main body 122 of an adjacent edge frame 120 by the second fixing element 143 thereof.

In this embodiment, the first fixing element 141 may include a first fixing hole 145, and the second fixing element 143 may include a second fixing hole 146. As shown in FIG. 6, when the first fixing hole 145 of the first fixing element 141 of the edge frame 120 is aligned with the second fixing hole 146 of the second fixing element 143 of the adjacent edge frame 120, the first and the second fixing elements 141, 143 can be fixed by a third fixing element 148 penetrating the first and the second fixing elements 141, 143, such that the adjacent edge frames 120 can be fixed. The third fixing element 148 may include a bolt, a screw, or a crew nail.

Referring additionally to FIG. 4, since each of the edge frames 120 includes the first clamp member 127 and the second clamp member 128, and the first fixing element 141 and the second fixing element 143, the light guide plate 110 can be clamped by the first and second clamp members 127, 128 of the edge frame 120, and the main body 122 of the edge frame 120 can be pivoted to the second and first fixing elements 143, 141 located on the main body 122 of the adjacent edge frame 120 by the first and the second fixing elements 141, 143 thereof. Consequently, the light guide plate 110 is positioned and fixed through use of only the edge frames 120 of the lighting device 100, such that the lighting device 100 does not need to include a conventional bottom plate. Hence, the lighting device 100 reduces the material and assembly costs. Moreover, the lighting device 100 can emit light through the two light emitting surfaces 114, such that light output utility can be increased and electric power can be saved.

In this embodiment, the shape of the first fixing element 141 of each of the edge frames 120 is different from the shape of the second fixing element 143 thereof. The first fixing element 141 extends outward from the first end 142 of the main body 122 in a direction corresponding to the direction that the first clamp member 127 extends outward from the main body 122, such that the first fixing element 141 can cover the second fixing element 143 of the main body 122 of the adjacent edge frame 120. That is to say, the first fixing element 141 may also function as a clamp member for clamping the second fixing element 143 of the adjacent edge frame 120.

It is to be noted that the first fixing element 141 of each of the edge frames 120 is referred to as a third clamp member in the following description.

As shown in FIG. 5 and FIG. 6, each of the edge frames 120 may include the main body 122, the first clamp member 127, the second clamp member 128, and a third clamp member 141. The third clamp member 141 is located on an end 142 of the main body 122 of the edge frame 120 to clamp an end 144 of the edge frame 120 adjacent to the third clamp member 141. The third clamp member 141 located on the main body 122 includes a first fixing hole 145. The other end 144 of the main body 122 includes a second fixing hole 146. When the first fixing hole 145 is aligned with the second fixing hole 146 of the adjacent edge frame 120, the third clamp member 141 and the end 144 including the second fixing hole 146 of the adjacent edge frame 120 are fixed by a fixing element 148 penetrating the third clamp member 141 and the end 144 including the second fixing hole 146 of the adjacent edge frame 120, such that adjacent edge frames 120 can be fixed.

Figure 7:
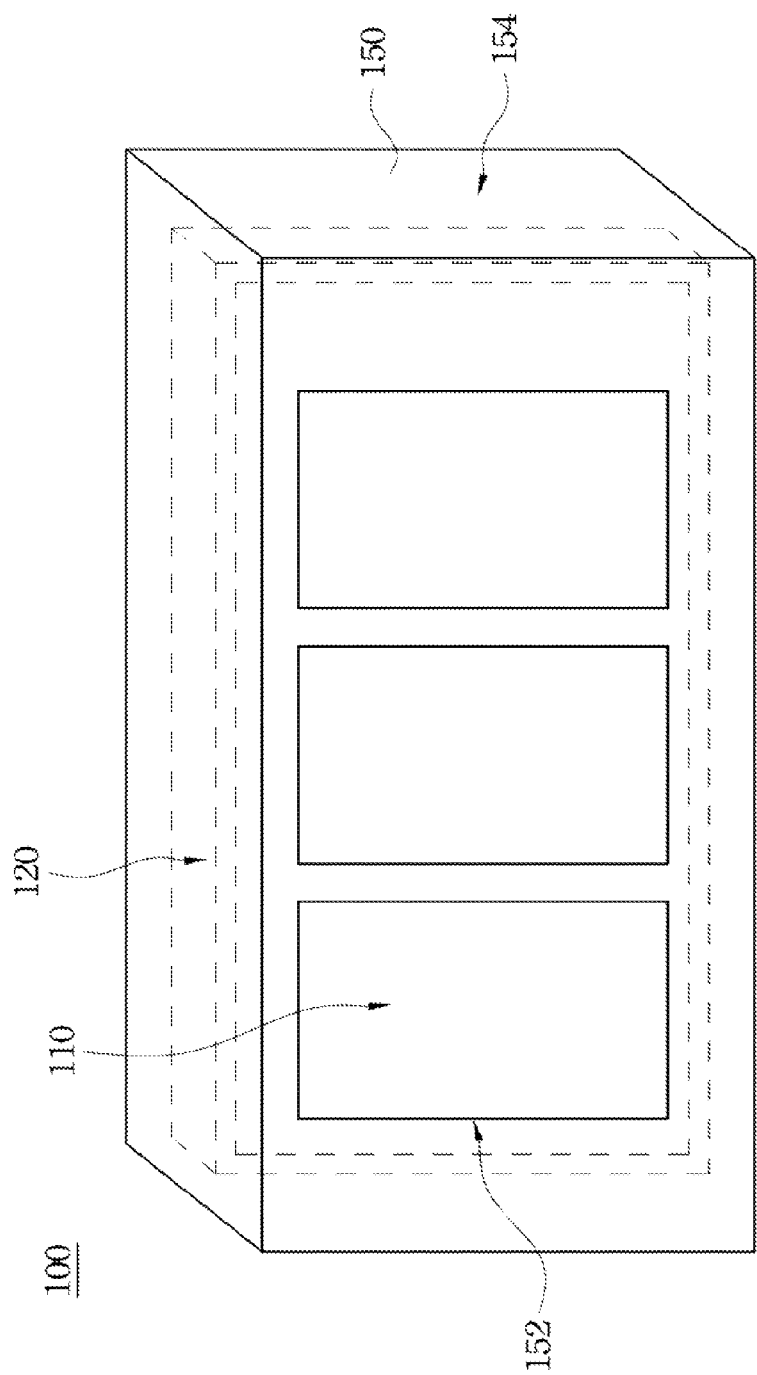
FIG. 7 is a perspective view of a lighting device of an embodiment of the present invention.

FIG. 7 is a perspective view of a lighting device 100 of an embodiment of the present invention. As shown in FIG. 7, the lighting device 100 further includes a housing 150 including at least one light transmissive portion 152 and an accommodating space 154. The accommodating space 154 accommodates the light guide plate 110, the edge frames 120, and the light sources (not shown) located in the edge frames 120. The position of the light transmissive portion 152 corresponds to the position of the light guide plate 110. When the light guide plate 110 emits light, the light can be emitted from the light transmissive portion 152 of the housing 150. Moreover, when the housing 150 includes two opposite light transmissive portions 152 in the front and the back sides thereof, as long as the positions of the two opposite light transmissive portions 152 correspond to the position of the light guide plate 110, the lighting device 100 can emit light through two sides.

It is to be noted that the connection relationship of the aforementioned elements will not be repeated in the following description, and only aspects related to another type of the edge frame 120 will be described.

Figure 8:
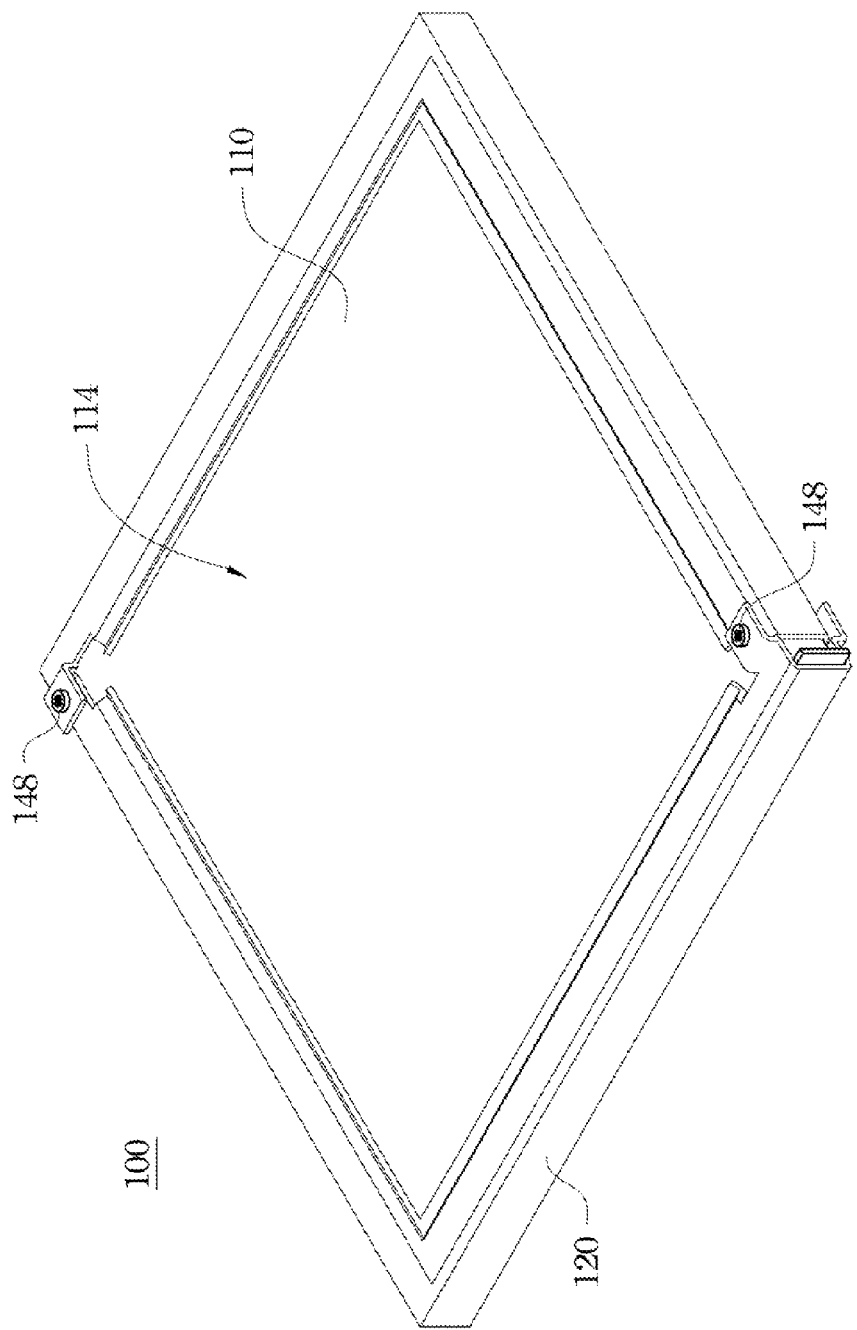
FIG. 8 is a perspective view of a lighting device of an embodiment of the present invention.
Figure 9:
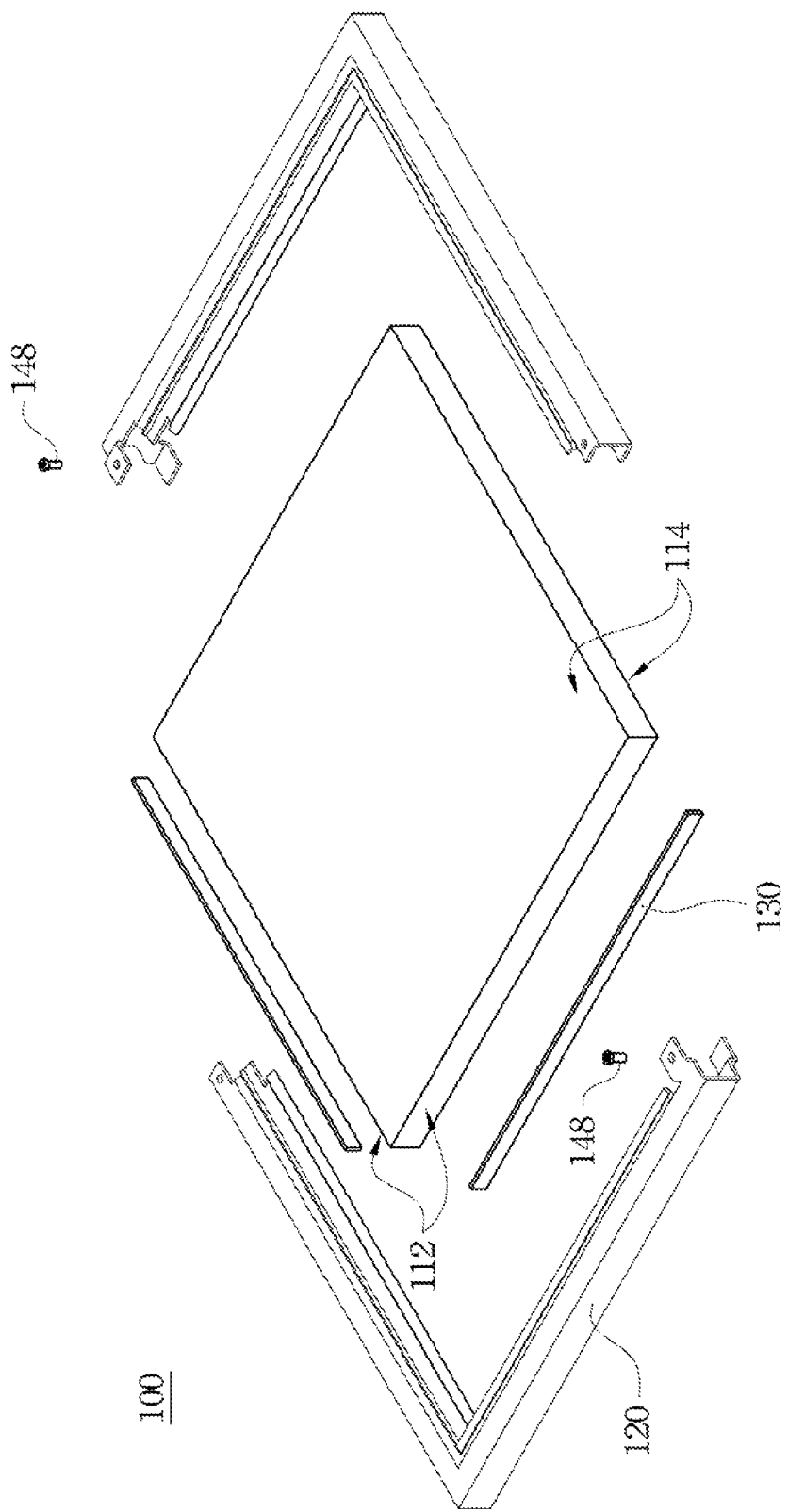
FIG. 9 is an exploded view of the lighting device shown in FIG. 8.

FIG. 8 is a perspective view of a lighting device 100 of an embodiment of the present invention. FIG. 9 is an exploded view of the lighting device 100 shown in FIG. 8. As shown in FIG. 8 and FIG. 9, the lighting device 100 includes a 2M-sided polygonal light guide plate 110, M edge frames 120 and at least one light source 130. The 2M-sided polygonal light guide plate 110 includes 2M light incident surfaces 112 and two opposite light emitting surfaces 114, and each of the light incident surfaces 112 is perpendicular to the light emitting surfaces 114. Each of the edge frames 120 corresponds to two adjacent light incident surfaces 112. In this embodiment, M is two as an example. Moreover, each of the two edge frames 120 is V-shaped or L-shaped. In addition, the number of the light sources 130 is two in this embodiment, and only two adjacent light incident surfaces 112 receive light emitted from the two light sources 130 (i.e., the two light sources 130 are respectively disposed next to two adjacent light incident surfaces 112).

However, in other embodiments, M may also be a natural number more than or equal to 2, and the number of the light sources 130 may be set as required. The present invention is not limited in this regard. Compared with a conventional lighting device, each of the edge frames of the lighting device includes the first and second clamp members, such that the light guide plate can be clamped by the first and second clamp members of the edge frame. Moreover, the main body of each of the edge frames can be pivoted to the second and first fixing elements located on the main body of the adjacent edge frame by the first and the second fixing elements thereof. As a result, the light guide plate is positioned and fixed through use of only the edge frames of the lighting device, such that the lighting device does not need to include a conventional bottom plate. Therefore, the lighting device reduces the material and assembly costs. Moreover, the lighting device can emit light through the two light emitting surfaces, such that light output utility can be increased and electric power can be saved.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A lighting device comprising:
    an N-sided polygonal light guide plate comprising N light incident surfaces and two opposite light emitting surfaces, wherein each of the light incident surfaces is perpendicular to the light emitting surfaces, and N is a natural number more than or equal to 3;
    N edge frames, wherein each of the edge frames corresponds to one of the light incident surfaces, and each of the edge frames comprises:
        a main body bendedly formed by a first, a second, and a third adjacent rectangular planes, wherein the main body comprises an accommodating groove and an opening;
        a first clamp member and a second clamp member symmetrically extending outward respectively from the edges of the first and the third rectangular planes, wherein a top and a bottom surfaces of the light guide plate corresponding respectively to the light emitting surfaces are respectively clamped by the first and the second clamp members of the edge frame, and the corresponding light incident surface is inserted in the main body of the edge frame through the opening of the main body of the edge frame, such that the corresponding light incident surface is accommodated in the accommodating groove of the edge frame; and
        a first fixing element and a second fixing element respectively disposed on a first and a second ends of the main body of the edge frame, wherein the edge frame is pivoted to the second and the first fixing elements disposed on the main body of an adjacent one of the edge frames respectively by the first and the second fixing elements thereof, and the first fixing element of the edge frame accommodates the second fixing element of the adjacent one of the edge frames; and
    at least one light source disposed in the accommodating groove of one of the edge frames and adjacent to the corresponding light incident surface, wherein when light is emitted from the light source, the light enters the light guide plate from the corresponding light incident surface, and is emitted through the two light emitting surfaces.

2. The lighting device as claimed in claim 1, wherein the first and the second fixing elements of each of the edge frames respectively comprise a first and a second fixing holes, when the first fixing hole of the first fixing element of one of the edge frames is aligned with the second fixing hole of the second fixing element of an adjacent one of the edge frames, the first and the second fixing elements are fixed by a third fixing element penetrating the first and the second fixing elements, such that the adjacent edge frames are fixed to each other.

3. The lighting device as claimed in claim 2, wherein the third fixing element comprises a bolt, a screw, or a crew nail.

4. The lighting device as claimed in claim 3, further comprising:
    a housing comprising at least one light transmissive portion and an accommodating space, wherein the accommodating space accommodates the light guide plate, the edge frames, and the light source, and the position of the light transmissive portion corresponds to the position of the light guide plate.

5. The lighting device as claimed in claim 1, wherein the main body, and the first and the second clamp members of each of the edge frames are formed as a single piece.

6. The lighting device as claimed in claim 1, wherein the light source comprises a light emitting diode.

7. The lighting device as claimed in claim 1, wherein the first fixing element extends outward from the main body in a direction corresponding to a direction that the first clamp member extends outward from the main body.

8. A lighting device comprising:
    an N-sided polygonal light guide plate comprising N light incident surfaces and two opposite light emitting surfaces, wherein each of the light incident surfaces is perpendicular to the light emitting surfaces, and N is a natural number more than or equal to 3;
    N edge frames, wherein each of the edge frames corresponds to one of the light incident surfaces, and each of the edge frames comprises:
        a main body bendedly formed by a first, a second, and a third adjacent rectangular planes, wherein the main body comprises an accommodating groove and an opening;
        a first clamp member and a second clamp member symmetrically extending outward respectively from the edges of the first and the third rectangular planes, wherein a top and a bottom surfaces of the light guide plate corresponding respectively to the light emitting surfaces are respectively clamped by the first and the second clamp members of the edge frame, and the corresponding light incident surface is inserted in the main body of the edge frame through the opening of the main body of the edge frame, such that the corresponding light incident surface is accommodated in the accommodating groove of the edge frame; and a third clamp member disposed on an end of the main body of the edge frame for clamping an end of one of the edge frames adjacent to the third clamp member, wherein the third clamp member of the edge frame accommodates the end of one of the edge frames adjacent to the third clamp member; and at least one light source disposed in the accommodating groove of one of the edge frames and adjacent to the corresponding light incident surface, wherein when light is emitted from the light source, the light enters the light guide plate from the corresponding light incident surface, and is emitted through the two light emitting surfaces.

9. The lighting device as claimed in claim 8, wherein the third clamp member disposed on the main body of each of the edge frames comprises a first fixing hole, and another end of the main body comprises a second fixing hole, when the first fixing hole of the third clamp member of one of the edge frames is aligned with the second fixing hole in an end of an adjacent one of the edge frames, the third clamp member and the end comprising the second fixing hole are fixed by a fixing element penetrating the third clamp member and the end comprising the second fixing hole, such that the adjacent edge frames are fixed to each other.

10. The lighting device as claimed in claim 9, wherein the fixing element comprises a bolt, a screw, or a crew nail.

11. The lighting device as claimed in claim 10, further comprising:

a housing comprising at least one light transmissive portion and an accommodating space, wherein the accommodating space accommodates the light guide plate, the edge frames, and the light source, and the position of the light transmissive portion corresponds to the position of the light guide plate.

12. The lighting device as claimed in claim 8, wherein the main body, and the first and the second clamp members of each of the edge frames are formed as a single piece.

13. The lighting device as claimed in claim 8, wherein the light source comprises a light emitting diode.

14. The lighting device as claimed in claim 8, wherein the third damp member extends outward from the main body in a direction corresponding to a direction that the first damp member extends outward from the main body.

15. A lighting device comprising:

a 2M-sided polygonal light guide plate comprising 2M light incident surfaces and two opposite light emitting surfaces, wherein each of the light incident surfaces is perpendicular to the light emitting surfaces, and M is a natural number more than or equal to 2;

M edge frames, wherein each of the edge frames corresponds to two adjacent light incident surfaces, and each of the edge frames comprises:

a main body bendedly formed by a first, a second, and a third adjacent rectangular planes, wherein the main body comprises an accommodating groove and an opening;

a first clamp member and a second clamp member symmetrically extending outward respectively from the edges of the first and the third rectangular planes, wherein a top and a bottom surfaces of the light guide plate corresponding respectively to the light emitting surfaces are respectively clamped by the first and the second clamp members of the edge frame, and the corresponding light incident surface is inserted in the main body of the edge frame through the opening of the main body of the edge frame, such that the corresponding light incident surface is accommodated in the accommodating groove of one of the edge frames; and a third clamp member disposed on an end of the main body of the edge frame for clamping an end of one of the edge frames adjacent to the third clamp member, wherein the third clamp member of the edge frame accommodates the end of one of the edge frames adjacent to the third clamp member; and at least one light source disposed in the accommodating groove of one of the edge frames and adjacent to the corresponding light incident surface, wherein when light is emitted from the light source, the light enters the light guide plate from the corresponding light incident surface, and is emitted through the two light emitting surfaces.

16. The lighting device as claimed in claim 15, wherein each of the edge frames is V-shaped or L-shaped.

17. The lighting device as claimed in claim 15, wherein the third clamp member disposed on the main body of each of the edge frames comprises a first fixing hole, and another end of the main body comprises a second fixing hole, when the first fixing hole of the third clamp member of one of the edge frames is aligned with the second fixing hole in an end of an adjacent one of the edge frames, the third clamp member and the end comprising the second fixing hole are fixed by a fixing element penetrating the third clamp member and the end comprising the second fixing hole, such that the adjacent edge frames are fixed to each other.

18. The lighting device as claimed in claim 17, wherein the fixing element comprises a bolt, a screw, or a crew nail.

19. The lighting device as claimed in claim 18, further comprising:

a housing comprising at least one light transmissive portion and an accommodating space, wherein the accommodating space accommodates the light guide plate, the edge frames, and the light source, and the position of the light transmissive portion corresponds to the position of the light guide plate.

20. The lighting device as claimed in claim 15, wherein the main body, and the first and the second clamp members of each of the edge frames are formed as a single piece.

21. The lighting device as claimed in claim 15, wherein the light source comprises a light emitting diode.

22. The lighting device as claimed in claim 15, wherein the third clamp member extends outward from the main body in a direction corresponding to a direction that the first clamp member extends outward from the main body.

* * * * *